(12) United States Patent
Gehde

(10) Patent No.: US 6,877,539 B2
(45) Date of Patent: Apr. 12, 2005

(54) WELDING APPARATUS

(75) Inventor: Michael Gehde, Aachen-Walhelm (DE)

(73) Assignee: Wegener GmbH, Aachen (DE)

( * ) Notice: Subject to any disclaimer, the term of this patent is extended or adjusted under 35 U.S.C. 154(b) by 204 days.

(21) Appl. No.: 10/266,585

(22) Filed: Oct. 9, 2002

(65) Prior Publication Data

US 2003/0066861 A1 Apr. 10, 2003

(30) Foreign Application Priority Data

Oct. 10, 2001 (DE) ..................................... 201 16 623 U

(51) Int. Cl.[7] .......................... B65C 65/00; B65C 65/02; B65C 65/20; B65C 65/78
(52) U.S. Cl. ........................ 156/391; 156/499; 156/502; 156/580
(58) Field of Search .................... 156/391, 502, 156/497, 599, 580, 583.1, 499, 304.1, 304.2, 304.6

(56) References Cited

U.S. PATENT DOCUMENTS 4,781,787 A * 11/1988 Weissfloch et al. ......... 156/507
5,112,210 A * 5/1992 Weissfloch ................... 425/383
5,795,431 A * 8/1998 Weissfloch ................... 156/358

FOREIGN PATENT DOCUMENTS

| DE | GM 85 31 748 | 4/1986 | |
|---|---|---|---|
| DE | 35 39 842 A1 | 5/1987 | |
| DE | 20117119 U1 * | 2/2002 | ........... B29C/65/20 |
| DE | 20118604 U1 * | 2/2002 | ........... B29C/65/78 |
| EP | 0 595 213 B1 | 10/1993 | |

* cited by examiner

Primary Examiner—Sue A. Purvis
(74) Attorney, Agent, or Firm—Liniak, Berenato & White, LLC

(57) ABSTRACT

A welding apparatus for plastic work pieces has two welding tables arranged next to one another. A propulsion device displaces the welding tables. The propulsion device has a drive motor and a propulsion rod assembly. The propulsion rod assembly has spatially separated double arm levers with two lever arms in each case. The two lever arms are each mounted in a rotatable manner on an axis of rotation and are in a mechanical state of rotary connection with one another. One set of lever arms is kinematically connected to one welding table and the other lever arms are kinematically connected to the other welding table. During rotary movement of the double arm levers, the welding tables are moved toward one another in one direction of rotation, and away from one another in the other direction of rotation.

27 Claims, 3 Drawing Sheets

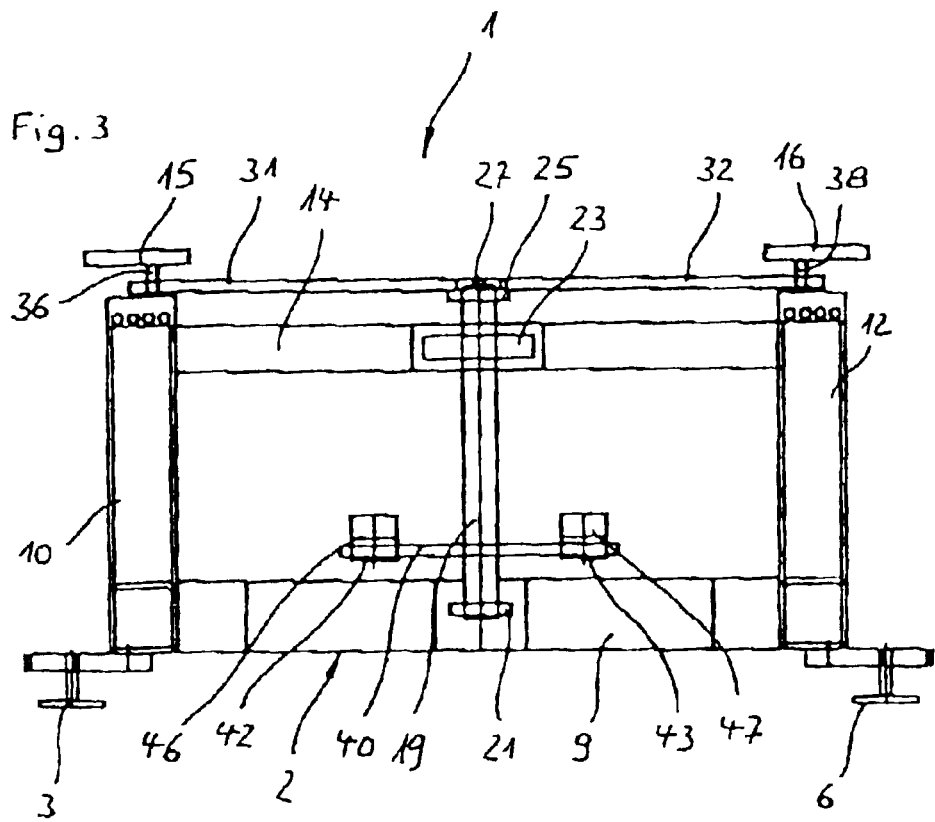

WELDING APPARATUS

Figure 1:
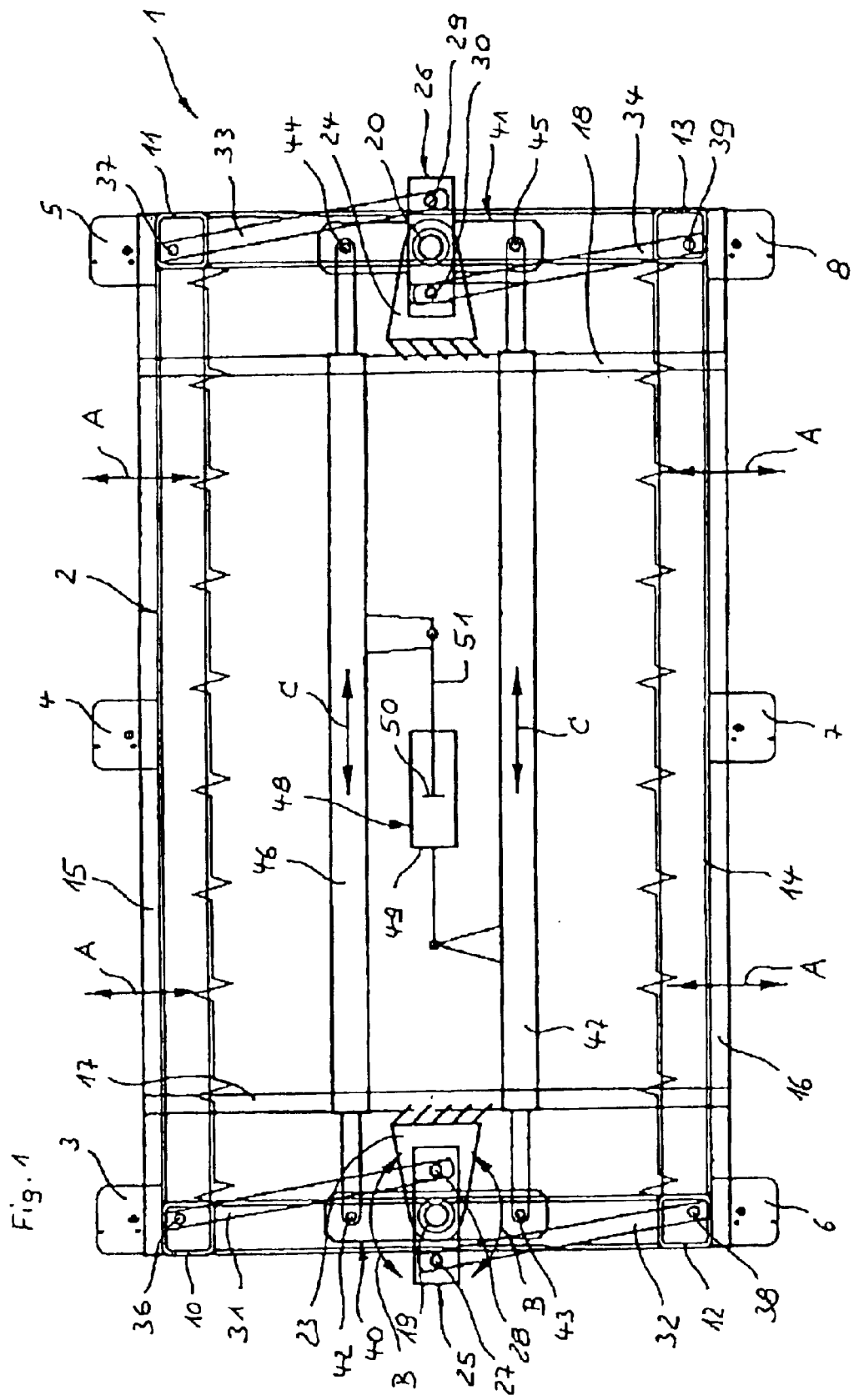

The invention pertains to a welding apparatus for welding plastic work pieces, especially plastic sheets, with a base frame in or on which two welding tables are arranged next to one another and on which the plastic work pieces are capable of being securely clamped and which are mounted in a manner that permits displacement, whereby a propulsion device is provided for displacing the welding tables in opposite directions of movement, and whereby the propulsion device has a drive motor and a propulsion rod assembly that transfers propulsive force from the drive motor to the welding tables.

Such a welding apparatus has been described, for example, in DE 35 39 842 A1, EP 0 595 213 B1, and DE-GM 85 31 748. It has a longitudinally extended base frame on the upper side of which two welding tables, which extend in a horizontal plane, are arranged next to one another. In the region of each of the adjacent front sides, the welding tables have clamping beams on their upper sides, whereby these clamping beams have a plurality of clamping plates that are arranged next to one another over their length, and whereby these clamping plates are capable of being lowered onto their assigned welding table. A plastic sheet can be clamped securely on each welding table with the help of the clamping beams.

The welding tables are mounted, in a manner that permits displacement, on the base frame, and they can be moved toward one another or away from one another with the help of the propulsion device. In order to do this, the propulsion devices have a drive motor and a propulsion rod assembly that transfers propulsive force from the drive motor to the welding tables. The propulsion rod assembly is configured in such a way that the welding tables move synchronously and oppositely to one another when propulsion is taking place.

A hot blade is positioned in the region between the two welding tables, whereby this hot blade is provided for heating the plastic sheets' front sides that are to be joined to one another. The heating blade is capable of being moved vertically in the gap between the adjacent front sides of the welding tables. A movement arrestment beam is present underneath the heating blade.

A welding process with such a welding apparatus is initiated by propelling the welding tables toward the movement arrestment beam, which has been propelled into the gap, whereby the welding tables each come into a position of adjacency at widened out sections of the movement arrestment beam. The plastic sheets are then positioned on the welding tables in such a way that they come into a position of adjacency at less wide sections of the movement arrestment beam. A piece of each of them then projects over the associated front side of the welding table. After securely clamping the plastic sheets by lowering the clamping plates onto the clamping beam, the welding tables are moved apart from one another, and the heating blade is lowered sufficiently far that it is oriented in the plane of movement of the plastic sheets. The welding tables are then moved toward one another again until the plastic sheets come into a position of adjacency with their front sides, which are to be joined together, on the heating blade. They are heated on the heating blade and then, after moving the heating blade away, they are pressed against one another by the application of closing pressure via the welding tables. After cooling, the joint between the plastic sheets is complete.

Pneumatic cylinder units serve as the drive motor, whereby these pneumatic cylinder units are arranged parallel to one another and each act on a pair of drive levers that are positioned opposite one another, whereby these drive levers are capable of being moved synchronously but oppositely relative to one another, and whereby each drive lever is connected to the relevant welding table. The drive levers are seated on drive shafts that are in a state of rotary connection with one another via cogwheels.

The propulsion devices that are known are costly to operate, heavy, and expensive and, moreover, they take up a lot of room. Synchronization of the movements of the welding tables is not exact because of play via the cogwheels.

The problem that therefore forms the basis of the invention in the case of a welding apparatus of the type that was designated at the beginning is to configure the propulsion device in such a way that it can be manufactured simply and in a manner that is favorable in terms of costs, whereby it nevertheless ensures exact movement of the welding tables.

In accordance with the invention, this problem is solved by way of the feature that the propulsion rod assembly has spatially separated double arm levers with two lever arms in each case, whereby the spatially separated double arm levers are oriented transversely to the directions of movement of the welding tables, and whereby the two lever arms are each mounted in a rotatable manner on an axis of rotation and are in a mechanical state of rotary connection with one another, and whereby one set of lever arms is kinematically connected to one welding table, and the other lever arms are kinematically connected to the other welding table in such a way that, during rotary movement of the double arm levers, the welding tables are moved toward one another in one direction of rotation, and away from one another in the other direction of rotation. The fundamental thought behind the invention is thus to provide at least two double arm levers that are kinematically connected to the welding tables in such a way that they are moved synchronously and oppositely to one another as a result of rotary movement of the double arm levers, whereby the double arm levers are in a state of rotary mechanical connection with one another. Such a construction can be realized in a simple manner, which is therefore favorable in terms of costs, and nevertheless operates extraordinarily exactly.

In embodying the invention, the feature is provided that the double arm levers are mounted next to one another and transversely to the directions of movement of the welding tables, namely in such a way that, preferably, the axes of rotation of the double arm levers are oriented in a plane, whereby these axes extend transversely to the directions of movement of the welding tables and are oriented as symmetrically as possible, i.e. in the plane of the heating blade. In this regard, they should be located at the same height in relation to the plane of movement of the welding tables, i.e., in terms of height, they should not be displaced relative to one another.

As a rule, it is sufficient if two double arm levers are present, especially when they are mounted in the region of the lateral edges of the welding tables. However, this does not rule out the presence of more double arm levers in the case of especially wide welding tables, whereby these double arm levers are then distributed over their width.

The double arm levers are preferably constructed in a symmetrical manner as a result of their having coupling points, which are located in a plane together with the relevant axis of rotation, i.e. opposite one another across the axis of rotation, and which are at the same distance from the relevant axis of rotation. The lever arms are expediently connected via an actuating rod in each case, i.e. the actuating rod, which is coupled to one lever arm of a double arm lever, is connected to one welding table, and the actuating rod, which is coupled to the other lever arm of it the double arm lever, is connected to the other welding table, whereby, for symmetry reasons, it is expedient that the actuating rods are constructed in such a way that they are equally long and also run parallel to one another. An especially expedient form of manufacture results when a double arm lever and its kinematic connection to the welding table form a rod assembly unit, and the rod assembly units are all constructed identically and are arranged identically or in mirror image form.

The extension of the axes of rotation of the double arm levers can basically be arranged in any desired manner. The axes of rotation should advantageously extend either vertically to the plane of movement of the welding tables, or parallel and transversely to the directions of movement of the welding tables and, in this case, they should preferably run coaxially relative to one another.

The mechanical rotary interconnection of the double arm levers can take place in various ways, whereby the objective of this connection should be that it is as free from play as possible, and that it is sufficiently stable that turning of the double arm levers takes place in a synchronous angular manner that is as complete as possible. In order to do this, a coupling rod assembly, which is preferably in the form of a parallelogram rod assembly, is especially suitable. This applies, in particular, to the form of embodiment in which the axes of rotation of the double arm levers extend vertically relative to the plane of movement of the welding tables, i.e. vertically in the case of a horizontal plane of movement. The parallelogram rod assembly can comprise two pivoting levers on the axes of rotation of the double arm levers and two preferably parallel coupling rods, which connect the pivoting levers, whereby the pivoting levers expediently have two lever arms and the two lever arms of each pivoting lever are oriented at an angle of 180° relative to one another.

As an alternative to rotary connection by means of a coupling rod assembly, the double arm levers can also be mechanically synchronized via at least one rotary shaft. This solution suggests itself especially when the axes of rotation of the double arm levers run parallel to the plane of movement of the welding tables and, in particular, when they run coaxially relative to one another, so that the double arm levers can be arranged on a continuous rotary shaft. No cogwheels are necessary in this case. One merely has to ensure that the rotary shaft is very rigid from the torsional point of view.

The propulsion rod assembly in accordance with the invention is not critical as far as the drive motor itself is concerned. Drive motors that operate in a linear manner suggest themselves in particular here in the prior art, i.e. one or more hydraulic cylinder units or pneumatic cylinder units that act at any position on the propulsion rod assembly. If the double arm levers are connected via a parallelogram rod assembly, then it is especially advantageous if the drive motor is connected to two components that move oppositely to one another, especially coupling rods in this case. In this way, the base frame remains free from forces during movement of the double arm levers and hence movement of the welding tables; this is because the drive motor is not connected to it the base frame.

In order that the welding tables shall move in an exactly linear manner, they should be mounted on linear guidance elements with, for example, a bearing system comprising revolving balls.

The invention is depicted in more detail in the drawings by means of a schematically illustrated example of an embodiment. The following aspects are shown.

Figure 2:
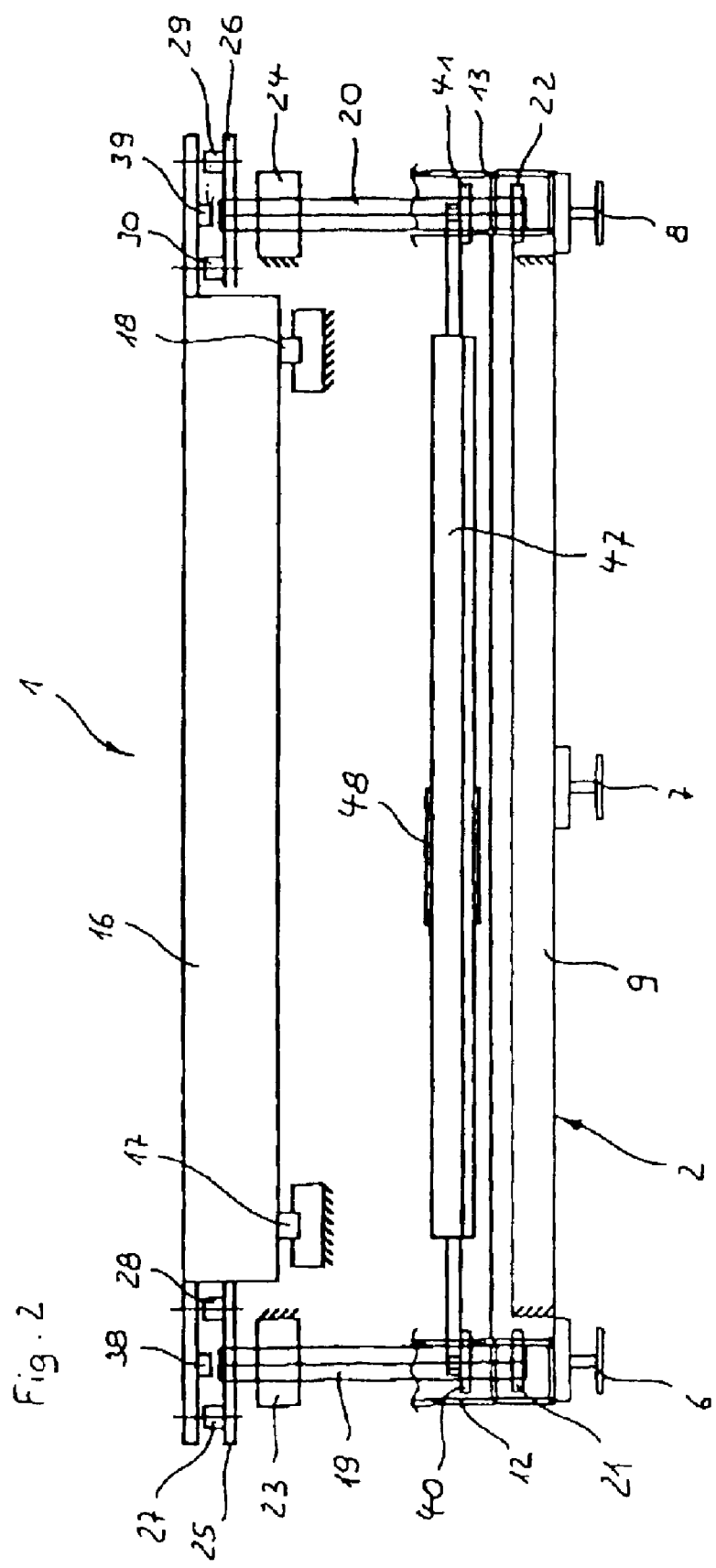

FIG. 1 shows a plan view of the welding apparatus in accordance with the invention, FIG. 2 shows a lateral view of the welding apparatus in accordance with FIG. 1, and FIG. 3 shows a front view of the welding apparatus in accordance with FIGS. 1 and 2.

The welding apparatus 1 that is illustrated in the figures has a base frame 2 that is designated in toto by 2 and that rests on six feet 3 through 8. The base frame 2 has a rectangular lower frame 9 that comprises steel pipes of square cross section from which columns 10 through 13 stand upright in the corners and support an upper frame 14 in the region of their upper ends, whereby this upper frame is also rectangular. Two rectangular welding tables 15, 16 are arranged on the upper frame 14, and these are merely illustrated in curtailed form in FIGS. 1 and 3. The welding tables 15, 16 are mounted on linear guidance elements 17, 18 in such a way that they are capable of being displaced horizontally in directions of movement that are indicated by the double arrows A in FIG. 1. Contrary to the illustration in FIGS. 1 and 3, their opposite front sides are located relatively near to one another, so that a longitudinal gap is present between them.

A clamping beam is arranged on the upper side of the welding tables 15, 16 in each case, namely in the region of their adjacent front sides, whereby plastic sheets, which have been positioned on the welding tables 15, 16, can be clamped securely, by means of the clamping beam, against the upper side of the welding tables 15, 16. Since they are not essential for specifying the present invention, the clamping beams have been omitted here for the sake of clarity. Reference can be made to the prior art, which was cited at the beginning, as far as they are concerned.

This also applies to the arrangement of a heating blade in the central longitudinal axis of the welding apparatus 1. It has also been omitted here for the sake of clarity.

A drive device is present for the opposite and synchronous movement of the two welding tables 15, 16 in the directions of the arrows A in accordance with FIG. 1, whereby this drive device is configured as follows in accordance with the invention.

A vertically extending axis of rotation 19, 20 is, in each case, arranged in the central longitudinal axis in the region of the front sides of the base frame 2. The axes of rotation 19, 20 are rotatably mounted, at their lower sides, in the lower frame 9 by means of bearings 21, 22, and they are rotatably mounted in the upper region by means of bearing blocks 23, 24 that are attached to the base frame 2. A straight double arm lever 25, 26 is, in each case, connected in a rotation-resistant manner to each associated axis of rotation 19, 20 at the upper free ends of these axes of rotation 19, 20. In the illustrations in accordance with FIGS. 1 and 2, the double arm levers 25, 26 extend straight in the longitudinal axis of the welding device 1.

Each lever arm of the double arm lever 25, 26 has a coupling point 27, 28 or, respectively, 29, 30 at which a pair of actuating rods 31, 32 or, respectively, 33, 34 act.

The actuating rods 31, 32, 33, 34 run horizontally and parallel to one another, though in the opposite direction within each pair. Of the actuating rods 31, 32 or, respectively, 33, 34 that originate from a double lever arm 25, 26, respectively, one actuating rod 31, 33 is connected to one welding table 15 via coupling points 36, 37, and the other actuating rod 32, 34 is connected to the other welding table 16 via coupling points 38, 39 in each case that are located there. Because of the identical construction of the double arm levers 25, 26 and the actuating rods 31, 32, 33, 34 and their parallel alignment, the two welding tables 15, 16 are each moved symmetrically in opposite directions (arrows B) when turning the double arm levers 25, 26. They move toward one another when the double arm levers 25, 26 are turned in the clockwise direction in the illustration in accordance with FIG. 1, and they move away from one another when the double arm levers 25, 26 are turned the other way.

Pivoting levers 40, 41, which are also of a double arm nature, are installed in a rotation-resistant manner on the axes of rotation 19, 20 in the lower region, whereby these double arm pivoting levers extend transversely to the double arm levers 25, 26 and run parallel to the front sides of the welding apparatus 1 in the position that is shown in FIG. 1. Each lever arm of the pivoting levers 40, 41 have a coupling point 42, 43 or, respectively, 44, 45. The lever arms of the pivoting levers 40, 41 are connected to one another via coupling rods 46, 47, whereby the lever arms of the pivoting levers each extend in the same direction, and whereby one coupling rod 46 acts on the coupling points 42, 44, and the other coupling rod 47 acts on the coupling points 43, 45. The coupling rods 46, 47 and the pivoting levers 40, 41 constitute a parallelogram rod assembly. This parallelogram rod assembly ensures that the two axes of rotation 19, 20 are in a state of rotary connection such that the axis of rotation 19, 20, and hence the double arm levers 25, 26, always move in the same direction of rotation when the two coupling rods 46, 47 are moved in mutually opposite directions (arrows C).

A pneumatic cylinder unit 48, which forms the drive motor, is arranged between the two coupling rods 46, 47, whereby the pneumatic cylinder unit is constructed in such a way that it acts in a double manner. The pneumatic cylinder unit 48 has a cylinder 49 that is connected to the lower coupling rod 47 in FIG. 1. A piston 50 runs within the cylinder 49, whereby the outward projecting piston rod 51 of this piston is connected to the upper coupling rod 46 in FIG. 1. The piston 50 can be subjected to pneumatic pressure alternately from one side or the other, as a result of which a correspondingly opposite movement of the coupling rods 46, 47 is achieved that consequently leads, in turn, to rotary movement of the axis of rotation 19, 20, and hence rotary movement of the double arm levers 25, 26.

What is claimed is:

1. Welding apparatus (1) for welding plastic work pieces with a base frame (2) in or on which two welding tables (15, 16) are arranged next to one another and on which the plastic work pieces are capable of being securely clamped and which are mounted in a manner that permits displacement, whereby a propulsion device is provided for displacing the welding tables (15, 16) in opposite directions of movement, and whereby the propulsion device has a drive motor (48) and a propulsion rod assembly that transfers propulsive force from the drive motor (48) to the welding tables (15, 16), characterized by the feature that the propulsion rod assembly has spatially separated double arm levers (25, 26) with two lever arms in each case, whereby the spatially separated double arm levers are oriented transversely to the directions of movement (arrows A) of the welding tables (15, 16), whereby the two lever arms are each mounted in a rotatable manner on an axis of rotation (19, 20) and are in a mechanical state of rotary connection with one another, and whereby one set of lever arms is kinematically connected to one welding table (15) and the other lever arms are kinematically connected to the other welding table (16) in such a way that, during rotary movement of the double arm levers (25, 26), the welding tables (15, 16) are moved toward one another in one direction of rotation (arrow B), and away from one another in the other direction of rotation (arrow B).

2. Welding apparatus in accordance with claim 1, characterized by the feature that the double arm levers (25, 26) are mounted transversely to the directions of movement (arrows A) of the welding tables (15, 16).

3. Welding apparatus in accordance with claim 2, characterized by the feature that the axes of rotation (19, 20) of the double arm levers (25, 26) lie in a plane that extends transversely to the directions of movement (arrows A) of the welding tables (15, 16).

4. Welding apparatus in accordance with claim 1, characterized by the feature that the double arm levers (25, 26) are arranged at the same height in relation to the plane of movement of the welding tables (15, 16).

5. Welding apparatus in accordance with claim 1, characterized by the feature that two double arm levers (25, 26) are present.

6. Welding apparatus in accordance with claim 5, characterized by the feature that the double arm levers (25, 26) are mounted in the region of the lateral edges of the welding tables (15, 16).

7. Welding apparatus in accordance with claim 1, characterized by the feature that the double arm levers (25, 26) have coupling points (27, 28, 29, 30) that lie in a plane together with the relevant axis of rotation (19, 20).

8. Welding apparatus in accordance with claim 1, characterized by the feature that the double arm levers (25, 26) have coupling points (27, 28, 29, 30) that are at the same distance from the relevant axis of rotation (19, 20).

9. Welding apparatus in accordance with claim 1, characterized by the feature that the lever arms are connected to one of the welding tables (15, 16) via, in each case, an actuating rod (31, 32, 33, 34).

10. Welding apparatus in accordance with claim 9, characterized by the feature that the actuating rods (31, 32, 33, 34) are constructed in such a way that they are equal in length.

11. Welding apparatus in accordance with claim 9, characterized by the feature that the actuating rods (31, 32 or, respectively, 33, 34), which act on a double arm lever (25, 26), run parallel to one another.

12. Welding apparatus in accordance with claim 11, characterized by the feature that the actuating rods (31, 32, 33, 34) all run parallel to one another.

13. Welding apparatus in accordance with claim 1, characterized by the feature that each double arm lever (25, 26) and its kinematic connection to the welding tables (15, 16) form a rod assembly unit, and the rod assembly units are all constructed identically and are arranged identically or in mirror image form.

14. Welding apparatus in accordance with claim 1, characterized by the feature that the double arm levers (25, 26) have axes of rotation (19, 20) that extend vertically relative to the plane of movement of the welding tables (15, 16).

15. Welding apparatus in accordance with claim 1, characterized by the feature that the double arm levers (25, 26) have axes of rotation that run parallel or coaxially relative to one another.

16. Welding apparatus in accordance with claim 1, characterized by the feature that the double arm levers (25, 26) are mechanically synchronized via a coupling rod assembly (40, 41, 46, 47).

17. Welding apparatus in accordance with claim 16, characterized by the feature that the coupling rod assembly (40, 41, 46, 47) is constructed in the form of a parallelogram rod assembly.

18. Welding apparatus in accordance with claim 17, characterized by the feature that the parallelogram rod assembly comprises pivoting levers on the axes of rotation (19, 20) of the double arm levers (25, 26) and two coupling rods (46, 47) that link the pivoting levers (40, 41).

19. Welding apparatus in accordance with at least claim 18, characterized by the feature that the drive motor (48) is coupled to two components (46, 47) of the coupling rod assembly, whereby these two components are movable oppositely to one another.

20. Welding apparatus in accordance with claim 18, characterized by the feature that the drive motor (48) is connected to the coupling rods (46, 47).

21. Welding apparatus in accordance with claim 18, characterized by the feature that the pivoting levers (40, 41) have two lever arms.

22. Welding apparatus in accordance with claim 21, characterized by the feature that the two lever arms of each pivoting lever (40, 41) are oriented at an angle of 180° relative to one another.

23. Welding apparatus in accordance with claim 1, characterized by the feature that the double arm levers (25, 26) are mechanically synchronized via at least one rotary shaft.

24. Welding apparatus in accordance with claim 23, characterized by the feature that the double arm levers (25, 26) are seated on the rotary shaft.

25. Welding apparatus in accordance with claim 1, characterized by the feature that the drive motor (48) is constructed in such a way that it operates in a linear manner.

26. Welding apparatus in accordance with claim 25, characterized by the feature that the drive motor is constructed in the form of a hydraulic cylinder unit or a pneumatic cylinder unit (48).

27. Welding apparatus in accordance with claim 1, characterized by the feature that the welding tables (15, 16) are mounted on linear guidance elements (17, 18).

* * * * *